United States Patent
Usie

(10) Patent No.: US 10,419,728 B2
(45) Date of Patent: Sep. 17, 2019

(54) MONITORING SYSTEM HAVING PERSONAL INFORMATION PROTECTION FUNCTION AND METHOD THEREOF

(71) Applicant: CHeKT LLC, Shreveport, LA (US)

(72) Inventor: Wesley Robert Usie, Shreveport, LA (US)

(73) Assignee: CHEKT LLC, Shreveport, LA (US)

( * ) Notice: Subject to any disclaimer, the term of this patent is extended or adjusted under 35 U.S.C. 154(b) by 2 days.

(21) Appl. No.: 15/683,480

(22) Filed: Aug. 22, 2017

(65) Prior Publication Data

US 2019/0068924 A1 Feb. 28, 2019

(51) Int. Cl.
*H04N 7/18* (2006.01)
*G06F 21/55* (2013.01)

(52) U.S. Cl.
CPC .......... *H04N 7/188* (2013.01); *G06F 21/554* (2013.01)

(58) Field of Classification Search
None
See application file for complete search history.

(56) References Cited

U.S. PATENT DOCUMENTS

2016/0328627 A1* 11/2016 Fujii .................. G06F 21/6254
2017/0076572 A1* 3/2017 Rao .................. G06K 9/00771
2018/0234665 A1* 8/2018 Shim .................. H04N 7/183

* cited by examiner

*Primary Examiner* — Lindsay J Uhl
(74) *Attorney, Agent, or Firm* — Heedong Chae; Lucem, PC

(57) ABSTRACT

Provided are a monitoring system having a personal information protection function and a method thereof. That is, according to the present invention, when the motion of the object is detected in the monitoring area where the privacy mode is set, the server provides metadata for the detected motion of the object to the monitoring center, and the monitoring center displays an avatar corresponding to the metadata on a predetermined background instead of the image associated with the monitoring area, thereby personal information protection is reinforced and reliability for the entire system is enhanced.

4 Claims, 4 Drawing Sheets

MONITORING SYSTEM HAVING PERSONAL INFORMATION PROTECTION FUNCTION AND METHOD THEREOF

TECHNICAL FIELD

The present invention relates to a monitoring system having a personal information protection function and a method thereof and more particularly, to a monitoring system having a personal information protection function and a method thereof in which when motion of an object is detected in a monitoring area set in a privacy mode, a server provides metadata about the detected motion of the object to a monitoring center, the monitoring center transmits a request for receiving a real-time image for the corresponding monitoring area to a terminal based on the metadata, and the terminal reports to the police station and the like or requests the server to suspend the privacy mode according to the request transmitted from the monitoring center.

BACKGROUND ART

A CCTV/DVR image monitoring system has been spread and installed for the purpose of security and safety.

The conventional CCTV/DVR image monitoring system provides a privacy mode function for personal information protection. When a person is included in an image acquired while the privacy mode is set, only a masking process is performed on a person in the corresponding image by which personal information on the acquired image is not sufficiently protected.

DISCLOSURE

Technical Problem

The present invention has been made in an effort to provide a monitoring system including a personal information protection function and a method thereof in which, when motion of an object is detected in a monitoring area set in a privacy mode, a server provides metadata on motion of the detected object to a monitoring center, and the monitoring center displays an avatar corresponding to the metadata on a predetermined background instead of the image related to the monitoring area.

Further, the present invention has also been made in an effort to provide a monitoring system including a personal information protection function and a method thereof in which a monitoring center transmits a request for real-time image reception for a monitoring area to the terminal, based on metadata provided from a server when a privacy mode is set, the terminal verifies the corresponding image associated with monitoring area through the terminal based on the request transmitted from the monitoring center and then directly reports to the police station or requests the pause of the privacy mode for the monitoring area when external intrusion or the like is suspected, and the server provides an image associated with the corresponding monitoring area to the monitoring center according to the pause request.

Technical Solution

An embodiment of the present invention provides a monitoring method having a personal information protection function, the monitoring method may include steps of: determining, by a server, when receiving an image associated with a monitoring area transmitted from an image acquiring device, whether a privacy mode for the monitoring area is set; identifying, by the server, whether motion of at least one object is detected in the image when the privacy mode for the monitoring area is set as the determining result; transmitting, by the server, metadata associated with the motion of the at least one object in the image to a monitoring center when the motion of the at least one object is detected in the image as the identifying result; displaying, by the monitoring center, one or more avatars corresponding to the metadata on a predetermined background color or background image based on the metadata; and transmitting, by the monitoring center, image reception request information for verifying the image associated with the monitoring area to a terminal based on the metadata.

Another embodiment of the present invention provides a monitoring system having a personal information protection function, the monitoring system may include: an image acquiring device configured to acquire an image associated with a monitoring area and transmit the acquired image; a server configured to determine, when receiving the image transmitted from the image acquiring device, whether a privacy mode for the monitoring area is set and transmit, when motion of at least one object is detected in the image while the privacy mode for the monitoring area is set, metadata associated with the motion of the at least one object in the image; a monitoring center configured to display one or more avatars corresponding to the metadata on a predetermined background color or background image based on the metadata and transmit image reception request information for verifying the image associated with the monitoring area based on the metadata; and a terminal configured to verify the image associated with the monitoring area acquired by the image acquiring device by interlocking with the server based on the image reception request information and transmit pause request information of the privacy mode for pausing the privacy mode to the terminal.

Advantageous Effects

According to the present invention, when the motion of the object, is detected in the monitoring area where the privacy mode is set, the server provides metadata for the detected motion of the object to the monitoring center, and the monitoring center displays an avatar corresponding to the metadata on a predetermined background instead of the image associated with the monitoring area, thereby personal information protection is reinforced and, reliability for the entire system is enhanced.

Further, according to the present invention, the monitoring center transmits a request for real-time image reception for the corresponding monitoring area to the terminal based on the metadata provided from the server while the privacy mode is set, the terminal verifies the corresponding monitoring area through the terminal based on the request transmitted from the monitoring center and then directly reports to the police station or requests the pause of the privacy mode for the monitoring area to the server when external intrusion or the like is suspected, and the server provides the image associated with the corresponding monitoring area to the monitoring center according to the pause request, thereby the user of the terminal may be aware of his privacy is continuously protected and convenience of use may be enhanced.

MODES OF THE INVENTION

Figure 1:
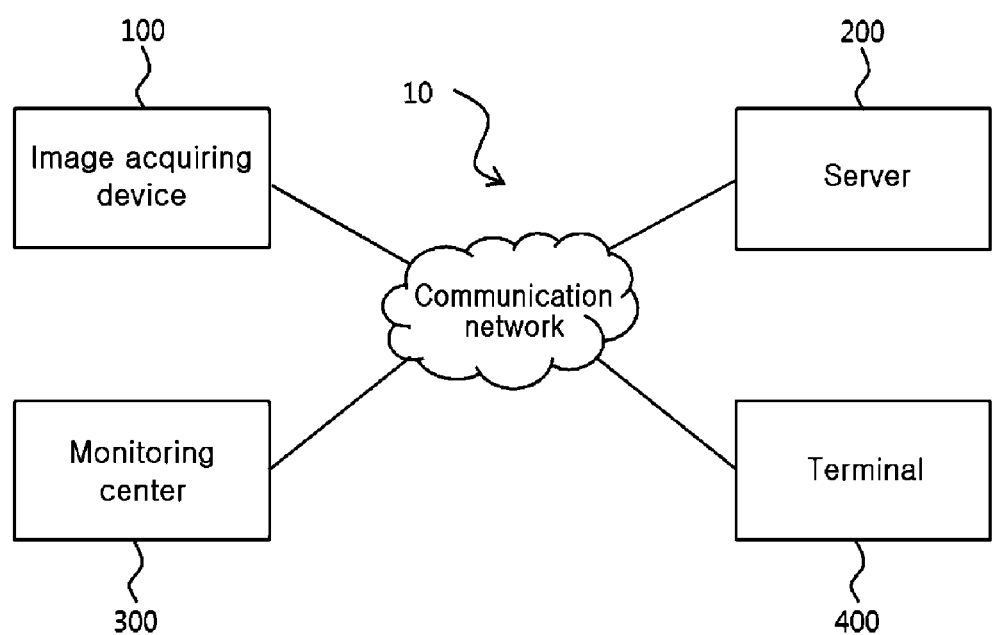
FIG. 1 is a block diagram illustrating a configuration of a monitoring system having a personal information protection function according to an embodiment of the present invention.

Technical terms used in the present invention are used only to describe specific embodiments, and are not intended to limit the present invention. Further, unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included.

Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present invention.

Hereinafter, embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a monitoring system 10 having a personal information protection function according to an embodiment of the present invention.

As illustrated in FIG. 1, the monitoring system 10 having a personal information protection function is configured by an image acquiring device 100, a server 200, a monitoring center 300, and a terminal 400. All the components of the monitoring system 10 illustrated in FIG. 1 are not required components, and the monitoring system 10 may be implemented by more components than the components illustrated in FIG. 1 or less components there than.

The image acquiring device 100 is installed in the predetermined monitoring area in associated with the terminal 400.

Further, the image acquiring device 100 may be an IP camera/IP encoder, a network camera, and the like.

Further, the image acquiring device 100 processes an image frame such as a still image or a moving image obtained by an image sensor (a camera module or a camera). That is, the image data obtained by the image sensor according to a CODEC is encoded and/or decoded to be suitable for each standard. The processed image frame is displayed on a display unit (not illustrated) connected to the image acquiring device 100 or transmitted to the server 200.

As such, the image acquiring device 100 acquires (alternatively, photographs) image information on a zone (alternatively, an area) installed with the image acquiring device 100 and transmits the acquired image information (alternatively, an image/an image associated with the monitoring area) to the server 200.

The server 200, the monitoring center, and the terminal 400 may include a communication unit (not illustrated) performing a communication function, a storage unit (alternatively, a memory) (not illustrated) performing an information storage function, a display unit (not illustrated) displaying information, a voice output unit (not illustrated) outputting voice information corresponding to the information, and a control unit (not illustrated) controlling components or performing functions according to the information, respectively.

Further, the server 200 receives the image transmitted from the image acquiring device 100.

Further, the server 200 determines whether the privacy mode is set for the monitoring area associated with the image.

That is, the server 200 determines whether the privacy mode is set by the terminal 400 for the monitoring area associated with the corresponding image.

As the determining result, when the privacy mode is not set for the monitoring area associated with the corresponding image, the server 200 transmits the corresponding image (alternatively, the image associated with the monitoring area) to the monitoring center 300.

Further, as the determining result, when the privacy mode is set for the monitoring area associated with the corresponding image, the server 200 determines whether motion of an object (alternatively, a person) is detected in the corresponding image (alternatively, the image associated with the monitoring area).

At this time, the server 200 may identify external intrusion into the monitoring area based on detection information such as an on/off state of a door associated with the monitoring area.

In addition, the server 200 may identify whether an appearance direction of the object in the image or the motion of the object is different from that previously learned for the corresponding monitoring area.

Further, the server 200 may identify the presence or absence of external intrusion based on a movement of a light such as a flashlight in the image.

As the identifying result, when the motion of the object is not detected in the corresponding image, the server 200 transmits to the monitoring center 300 metadata (alternatively, metadata indicating that there is no object in the corresponding image) indicating that the motion of the object is not detected in the corresponding image.

Further, as the identifying result, when the motion of the object is detected in the corresponding image, the server 200 transmits the metadata associated with the motion of the object in the corresponding image to the monitoring center 300. Herein, the metadata associated with the motion of the object in the image includes the number of objects in the image through analysis of the still image according to deep learning, location information (or coordinate information) of the object in the image through analysis of the still image according to the deep running, a type of object (or other objects) a shape of an object through analysis of the still image according to the deep running, a color of the object through analysis of the still image according to the deep running, a type or color of an article (alternatively, another object) held by the object through analysis of the still image according to the deep running, situation recognition information based on analysis information based on the analysis of the still image, and the like. In this case, the situation recognition information may be a case where a person holding a handgun is kicking the door, a case where people are fighting, and the like.

Further, when the object is detected in the image (for example, including a still image, a moving image, and the like), the server 200 may generate (alternatively, manage) metadata associated with the motion of the object in the image that includes information about current situations of the object, such as detection of an object in the image, tracking of the detected object, detection of a fall of an object, wandering of an object, leaving or taking an article by the detected object, fighting between objects, a type of object, colors configuring the object, and the like in addition to the number of objects in the image, location information of the object in the image, and a moving speed and/or moving pattern of the object.

Further, based on the metadata associated with the motion of the object in the image transmitted to the monitoring center 300, when the terminal 400 intends to request the pause of the privacy mode for the corresponding, monitoring area, the server 200 receives pause request information of the privacy mode transmitted from the terminal 400. Herein, the pause request information of the privacy mode includes information for converting automatically a normal mode into the privacy mode when the normal mode is maintained by releasing the predetermined privacy mode for a predetermined time (for example, including 30 minutes, 1 hour, 2 hour, or the like) and the predetermined time elapses, identification information of the terminal 400, information on the monitoring area associated with the terminal 400, information on the image acquiring device 100 associated with the monitoring area, and the like. In addition, the identification information of the terminal 400 includes a mobile directory number (MDN), a mobile IP, a mobile MAC, subscriber identity module (Sim) card unique information, a serial number, and the like.

In addition, the server 200 transmits an image associated with the corresponding monitoring area provided from the image acquiring device 100 to the monitoring center 300 based an the received pause request information of the privacy mode.

Further, the server 200 receives log information including a moving image for 5 minutes before and after the time which illegal intrusion associated with the monitoring area transmitted from the monitoring center 300 is determined, emergency occurrence time information at the time when the illegal intrusion is determined in the monitoring area, time information (alternatively, emergency report time information) at the time of providing emergency occurrence information on the illegal intrusion to the police station server, and the like.

Further, the server 200 stores the received log information in association with the monitoring area and/or the identification information of the terminal 400.

When the server 200 provides the image provided from the image acquiring device 100 to a manager connected to the server 200, the terminal 100, the monitoring center 300, or the like, the server records information about all devices or users to verify the corresponding image, and provides the recorded log to the terminal 100.

As such, by providing the log to the terminal 100 as an end user, the end user may feel that the personal information is protected even when the privacy mode is enabled or disabled.

The monitoring center 300 receives metadata (alternatively, metadata indicating that there is no object in the corresponding image) indicating that the motion of the object is not detected in the corresponding image transmitted from the server 200.

Further, the monitoring center 300 displays the metadata indicating that the motion of the object is not detected in the received image. At this time, the monitoring center 300 displays a predetermined background color (for example, a black color, a white color, etc.) or a predetermined background image instead of the image associated with the monitoring based on the metadata.

Further, the monitoring center 300 receives metadata associated with the motion of the object in the corresponding image transmitted from the server 200.

Further, the monitoring center 300 displays the metadata associated with the motion of the object in the received image. At this time, the monitoring center 300 may display one or more avatars or emoticons corresponding, to the metadata associated with the motion of the object in the image on the predetermined background color (for example, a black color, a white color, etc.) or the predetermined background image. Here, the monitoring center 300 may further display a motion speed and/or motion pattern of the object, current situation information of the object, and the like based on the metadata associated with the motion of the object.

Further, the monitoring center 300 may display an avatar for each object location, a type or state of the object according to the metadata, description (for example, including 'a person in blue clothes is wandering for 30 seconds', and 'a person with yellow hair and a person with black hair are fighting', etc.) on the behavior of the object, and the like based on the metadata associated with the motion of the object in the received image.

In addition, the monitoring center 300 (alternatively, the manager/operator of the monitoring center 300) may transmit to the terminal 400 image reception request information for receiving the image (alternatively, verifying the image) for the corresponding monitoring area based on the metadata associated with the motion of the object in the corresponding image.

Further, the monitoring center 300 receives an image associated with the corresponding monitoring area transmitted from the server 200.

Further, the monitoring center 300 displays the image associated with the received monitoring area.

Further, when it is determined that there is an intruder in the image displayed on the monitoring center 300, the monitoring center 300 provides information (alternatively, emergency occurrence information) about the occurrence of an emergency to the management server such as a police station registered in advance. Herein, the information (alternatively, emergency occurrence information) about the occurrence of the emergency includes a predetermined number of snapshots or moving images for a predetermined time before or after the occurrence of the emergency based on the emergency occurrence time associated with the emergency, emergency occurrence time information, emergency occurrence report time information, an address of a place where the emergency occurs, emergency contact information of the place where the emergency occurs, emergency contact information of an emergency manager of the place where the emergency occurs, and the like.

The terminal 400 may be a terminal associated with the monitoring area.

Further, the terminal 400 sets a privacy mode for personal information protection with respect to the monitoring area.

In this case, when the privacy mode is not set, the image acquired by the image acquiring device 100 may be provided to the monitoring center 300 via the server 200.

Further, when the privacy mode is set, the server 200 may generate metadata according to presence of the object in the image acquired by the image acquiring device 100 and provide the generated metadata to the monitoring center 300.

Further, the terminal 400 receives the image reception request information transmitted from the monitoring center 300.

Further, the terminal 400 verifies the image for the corresponding monitoring area acquired (alternatively, photographed) by the image acquiring device 100 by interlocking with the server 200.

Further, when it is determined that there is an intruder in the monitoring area by verifying the image for the monitoring area in the terminal 400, the terminal 400 reports directly to a management server (not illustrated) such as a police station.

Further, when it is determined that the intruder is present in the monitoring area by verifying the image for the monitoring area in the terminal 400, the terminal 400 transmits pause request information of the privacy mode to the server 200. Herein, the pause request information of the privacy mode includes information for converting automatically a normal mode into the privacy mode when the normal mode is maintained by releasing the predetermined privacy mode for a predetermined time (for example, including 30 minutes, 1 hour, 2 hour, or the like) and the predetermined time elapses, identification information of the terminal 400, information on the monitoring area associated with the terminal 400, information on the image acquiring device 100 associated with the monitoring area, and the like.

Further, when receiving the image reception request information transmitted from the monitoring center 300, the terminal 400 may transmit the pause request information of the privacy mode to the server 200.

Further, the terminal 400 receives a log (alternatively, log information) transmitted from the server 200 and displays the received log.

As such, when the motion of the object is detected in the monitoring area in which the privacy mode is set, the server provides the metadata about the detected motion of the object to the monitoring center, and in the monitoring center may display an avatar corresponding to the metadata on the predetermined background instead of the image associated with the monitoring area.

Further, as such, the monitoring center transmits a request for real-time image reception for the corresponding monitoring area to the terminal based on the metadata provided from the server while the privacy mode is set, the terminal verifies the corresponding monitoring area through the terminal based on the request transmitted from the monitoring center and then directly reports to the police station or requests the pause of the privacy mode for the monitoring area when external intrusion or the like is suspected, and the server may provide the image associated with the corresponding monitoring area to the monitoring center according to the pause request.

Hereinafter, a monitoring method having a personal information protection function according to the present invention will be described in detail with reference to FIGS. 1 to 4.

Figure 2:
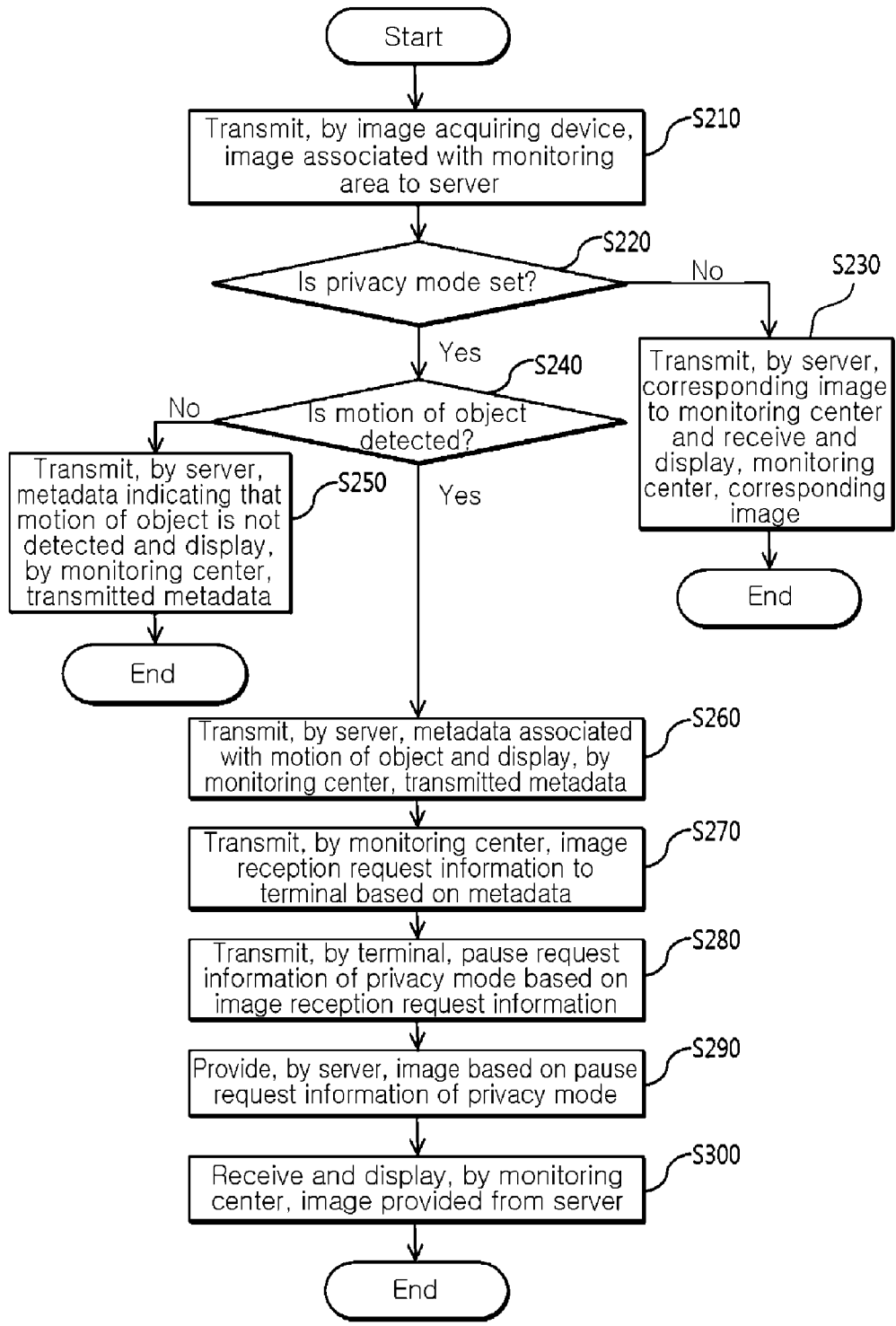
FIG. 2 is a flowchart illustrating a monitoring method having a personal information protection function according town embodiment of the present invention.

FIG. 2 is a flowchart illustrating a monitoring method having a personal information protection function according to an embodiment of the present invention.

First, the image acquiring device 100 acquires an image associated with the predetermined monitoring area associated with the terminal 400. Herein, the image acquiring device 100 may be an IP camera/IP encoder, a network camera, and the like.

Further, the image acquiring device 100 transmits the acquired image (alternatively, an image associated with the acquired monitoring, area) to the server 200.

As an example, the image acquiring device 100 transmits a first image photographed by a network camera installed in a first shop to the server 200 (S210).

Thereafter, the server 200 receives the image transmitted from the image acquiring device 100.

Further, the server 200 determines whether to set the privacy mode for the monitoring area associated with the image.

That is, the server 200 determines whether the privacy mode is set by the terminal 400 for the monitoring area associated with the corresponding image.

As an example, the server 200 receives the image transmitted from the image acquiring device 100.

Further, the server 200 determines whether the privacy mode is set by the terminal 400 with respect to the first shop (S220).

As the determining result, when the privacy mode is not set for the monitoring area associated with the corresponding image, the server 200 transmits the corresponding image (alternatively, the image associated with the monitoring area) to the monitoring center 300.

Further, the monitoring center 300 receives an image transmitted from the server 200 and displays the received image.

As an example, as the determining result, when the privacy mode is not set by the terminal 400 with respect to the first shop, the server 200 transmits the first image to the monitoring center 300.

Further, the monitoring center 300 receives a first image transmitted from the server 200 and displays the received first image (S230).

Further, as the determining result, when the privacy mode is set for the monitoring area associated with the corresponding image, the server 200 determines whether motion of an object (alternatively, a person) is detected in the corresponding image (alternatively, the image associated with the monitoring area).

As an example, as the determining result, when the privacy mode is set by the terminal 400 with respect to the first shop, the server 200 determines whether the motion of the object is detected in the first image (S240).

As the identifying result, when the motion of the object is not detected in the corresponding image, the server 200 transmits to the monitoring center 300 metadata (alternatively, metadata representing that there is no object in the corresponding image) representing that the motion of the object is not detected in the corresponding image.

Further, the monitoring center 300 receives metadata (alternatively, metadata indicating that there is no object in the corresponding image) indicating that the motion of the object is not detected in the corresponding image transmitted from the server 200 and displays the metadata indicating that the motion of the object is not detected in the corresponding received image. At this time, the monitoring center 300 displays a predetermined background color (for example, a black color, a white color, etc.) or a predetermined background image instead of the image associated with the monitoring based on the metadata.

For example, as the determining result, when the motion of the object is not detected in the first image, the server 200 transmits to the monitoring center 300 first metadata indicating that the motion of the object is not detected in the first image (300).

Further, the monitoring center 300 receives the first metadata indicating that the motion of the object is not detected in the first image transmitted from the server 200.

Figure 3:
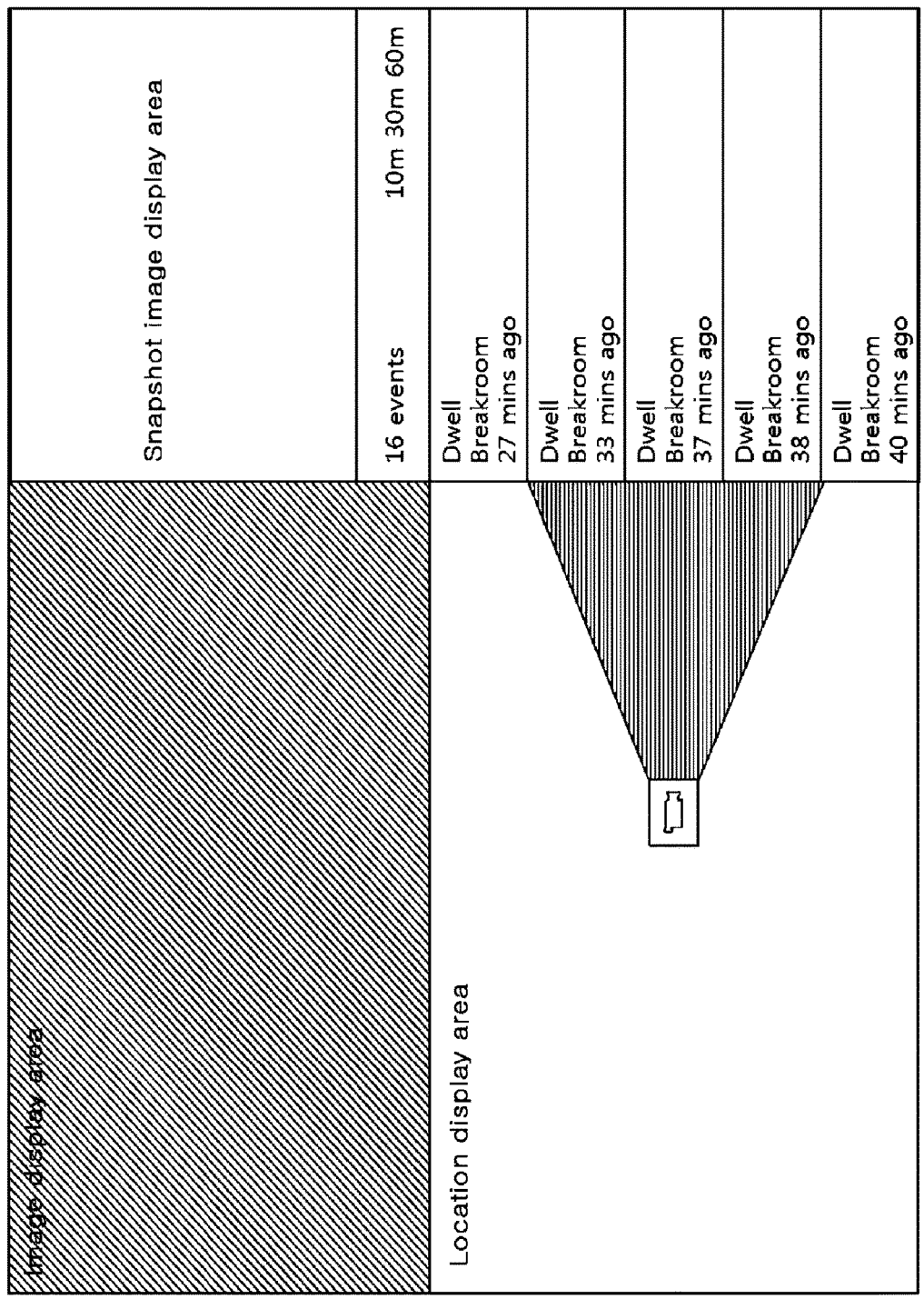
FIGS. 3 and 4 are diagrams illustrating a screen displayed in a monitoring center according to the embodiment of the present invention.

Further, as illustrated in FIG. 3, the monitoring center 300 displays on a monitoring screen only a predetermined white background color (indicated by an oblique line) instead of the image associated with the first shop based on the received first metadata. Here, the monitoring screen may include an area (indicated by an oblique line) displaying the image acquired by the image acquiring device 100, an area displaying a location where the image acquiring device 100 is installed, an area displaying a generated event list, an area displaying a snapshot associated with the corresponding event when any one of the event lists is selected (S250).

Further, as the identifying result, when the motion of the object is detected in the corresponding image, the server 200 transmits the metadata associated with the motion of the object in the corresponding image to the monitoring center 300. Herein, the metadata associated with the motion of the object in the image includes the number of objects in the image according to deep learning, location information (alternatively, coordinate information) of the object in the image through analysis of the still image according to the deep running, a type of object through analysis of the still image according to the deep running, a shape of an object through analysis of the still image according to the deep running, a color of the object through analysis of the still image according to the deep running, a type or color of an article (alternatively, another object) held by the object through analysis of the still image according to the deep running, situation recognition information based on analysis information according to the analysis of the still image, and the like. In this case, the situation recognition information includes a case where a person holding a handgun is kicking the door, a case where people are fighting, and the like.

Further, the monitoring center 300 receives metadata associated with the motion of the object in the corresponding image transmitted from the server 200 and displays metadata associated with the motion of the object in the received corresponding image. At this time, the monitoring center 300 displays one or more avatars corresponding to the metadata associated with the motion of the object in the image on the predetermined background color (for example, a black color, a white color, etc.) or the predetermined background image.

For example, as the identifying result, when the motion of two persons is detected in the first image, the server 200 transmits second metadata including the number of objects (for example, two persons) in the first image and location information of each object in the first image to the monitoring center 300.

Further, the monitoring center 300 receives the second metadata according to the motion of the object detected in the first image transmitted from the server 200.

Figure 4:
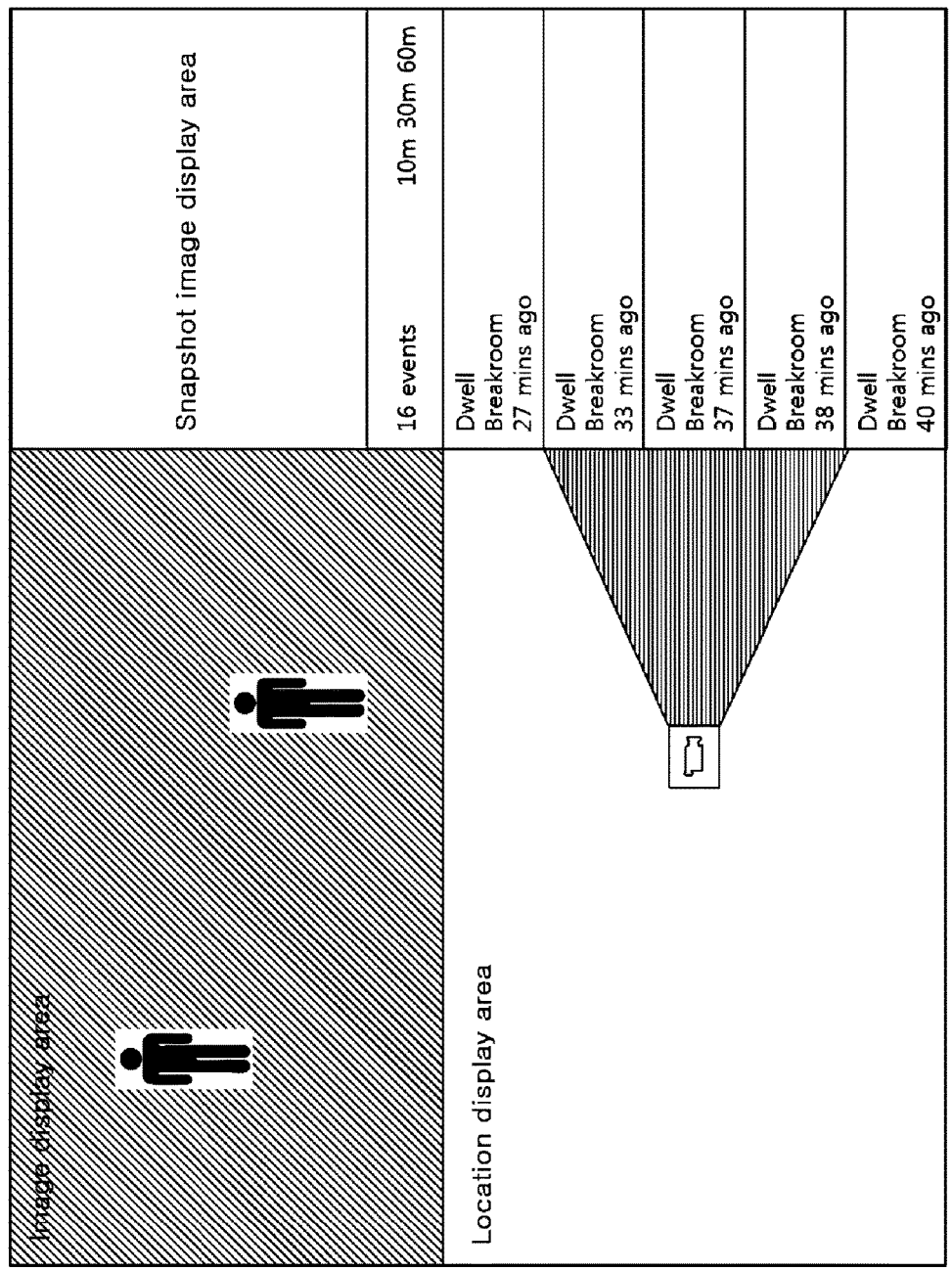

Further, as illustrated in FIG. 4, the monitoring center 300 displays on a monitoring screen a first avatar and a second avatar corresponding to two persons, on a predetermined white background color instead of the image associated with the first shop based on the received second metadata. Herein, the monitoring screen may include an area (indicated by an oblique line) displaying the image acquired by the image acquiring device 100, an area displaying a location where the image acquiring device 100 is installed, an area displaying a generated event list, an area displaying a snapshot associated with the corresponding event when any one of the event lists is selected, and the like (S260).

Thereafter, the monitoring center 300 (alternatively, the manager/operator of the monitoring center 300) transmits to the terminal 400 image reception request information for receiving the image (alternatively, verifying the image) for the corresponding monitoring area based on the metadata associated with the motion of the object in the corresponding image.

For example, the operator of the monitoring center 300 checks the displayed first avatar and second avatar, and transmits to the terminal the first image reception request information temporarily requesting the release of the privacy mode to the first shop so that the image in the shop may be verified in order to determine whether or not there is an intruder in the first shop associated with the first image (S270).

Thereafter, the terminal 400 receives the image reception request information transmitted from the monitoring center 300.

Further, the terminal 400 verifies the image for the corresponding monitoring area acquired (alternatively, photographed) by the image acquiring device 100 by interlocking with the server 200.

Further, when it is determined that there is an intruder in the monitoring area by verifying the image for the monitoring area in the terminal 400, the terminal 400 directly reports to a management server (not illustrated) such as a police station or transmits pause request information of the privacy mode to the server 200. Herein, the pause request information of the privacy mode includes information for converting automatically a normal mode into the privacy mode when the normal mode is maintained by releasing the predetermined privacy mode for a predetermined time (for example, including 30 minutes, 1 hour, 2 hour, or the like) and the predetermined time elapses, identification information of the terminal 400, information on the monitoring area associated with the terminal 400, information on the image acquiring device 100 associated with the monitoring area, and the like.

For example, the terminal 400 receives the first image reception request information transmitted from the monitoring center 300, and verifies a real-time image for the first shop acquired by the image acquiring device 100 by interlocking with the server 200.

Further, when an intruder is verified in the image for the first shop which is verified in real time, the terminal 400 transmits pause request information of the privacy mode for pausing the preset privacy mode set for one hour to the server 200 (S280).

Thereafter, the server 200 receives the pause request information of the privacy mode transmitted from the terminal 400.

In addition, the server 200 transmits an image associated with the corresponding monitoring area to the monitoring center 300 based on the received pause request information of the privacy mode.

For example, the server 200 receives the pause request information of the privacy mode transmitted from the terminal 400, and transmits the real-time image associated with the first shop acquired by the image acquiring device 100 in real time to the monitoring center 300 based on the received pause request information of the privacy mode (S290).

Thereafter, the monitoring center 300 receives an image associated with the corresponding monitoring area transmitted from the server 200.

Further, the monitoring center 300 displays the image associated with the received monitoring area.

Further, when it is determined that there is an intruder in the image displayed on the monitoring center 300, the monitoring center 300 provides information (alternatively, emergency occurrence information) about the occurrence of an emergency to the management server such as a police station registered in advance. Herein, the information (alternatively, emergency occurrence information) about the occurrence of the emergency includes a predetermined number of snapshots or moving images for a predetermined time before or after the occurrence of the emergency based on the emergency occurrence time associated with the emergency, emergency occurrence time information, emergency occurrence report time information, an address of a place where the emergency occurs, emergency contact information of the place where the emergency occurs, emergency contact information of an emergency manager of the place where the emergency occurs, and the like.

As an example, the monitoring center 300 receives a real-time image associated with the first shop transmitted from the server 200 and displays the received real-time image associated with the first shop.

Further, the operator of the monitoring center 300 verifies two intruders in he real-time image and provides emergency occurrence information for illegal intrusion to the pre-registered police station server.

Further, the monitoring center 300 provides to the server 200 log information including a moving image for 5 minutes before and after the time when illegal intrusion in the first shop is determined, emergency occurrence time information at the time when the illegal intrusion in the first shop is determined, time information (alternatively, emergency report time information) at the time of providing emergency occurrence information on the illegal intrusion to the police station server, and the like, and the server 200 stores the corresponding log information by interlocking with the first shop (alternatively, the terminal 400) (S300).

As described above, according to the embodiment of the present invention, when the motion of the object is detected in the monitoring area where the privacy mode is set, the server provides metadata for the detected motion of the object to the monitoring center, and the monitoring center displays an avatar corresponding to the metadata on a predetermined background instead of the image associated with the monitoring area, thereby reinforcing personal information protection and enhancing reliability for the entire system.

As described above, according to the embodiment of the present invention, the monitoring center transmits a request for real-time image reception for the corresponding monitoring area to the terminal based on the metadata provided from the server while the privacy mode is set, the terminal verifies the corresponding monitoring area through the terminal based on the request transmitted from the monitoring center and then directly reports to the police station or requests the pause of the privacy mode for the monitoring area to the server when external intrusion or the like is suspected, and the server provides the image associated with the corresponding monitoring area to the monitoring center according to the pause request, thereby enhancing convenience of use by recognizing that the personal privacy of the user of the terminal is continuously protected.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the embodiments disclosed in the present invention are used to not limit but describe the technical spirit of the present invention and the scope of the technical spirit of the present invention is not limited by the embodiments. The scope of the present invention should be interpreted by the appended claims and all technical spirit in the equivalent range thereto should be interpreted to be embraced by the claims of the present invention.

INDUSTRIAL APPLICABILITY

According to the present invention, when the motion of the object is detected in the monitoring area where the privacy mode is set, the server provides metadata associated with the detected motion of the object to the monitoring center, and the monitoring center displays an avatar corresponding to the metadata on a predetermined background instead of the image associated with the monitoring area, thereby personal information protection is reinforced and reliability for the entire system is enhanced. Therefore, the present invention may be widely used in a network camera field, an object detection field, an image field, a server field, a security surveillance field, and the like.

The invention claimed is:

1. A monitoring method having a personal information protection function, the monitoring method comprising steps of:
   determining, by a server, when receiving a still image associated with a monitoring area transmitted from a still image acquiring device, whether a privacy mode for the monitoring area is set;
   identifying, by the server, whether motion of at least one object is detected in the still image when the privacy mode for the monitoring area is set as the determining result;
   transmitting, by the server, only metadata associated with the motion of the at least one object in the still image to a monitoring center without sending the still image when the motion of the at least one object is detected in the still image as the identifying result;
   displaying, by the monitoring center, one or more avatars corresponding to the metadata on a predetermined background color or a predetermined background image based on the metadata; and transmitting, by the monitoring center, image reception request information for verifying the still image associated with the monitoring area to a terminal based on the metadata;

wherein the metadata associated with the motion of the at least one object in the still image includes at least one of number of the at least one object in the still image, location information of the at least one object in the still image, a type of the at least one object, a shape of the at least one object, a color of the at least one object, a type or color of an article held by the at least one object, and situation recognition information, the metadata being acquired by analysis of the still image according to deep learning.

2. The monitoring method of claim 1, further comprising:

verifying, by the terminal, the still image associated with the monitoring area acquired by the still image acquiring device by interlocking with the server based on the image reception request information;

transmitting, by the terminal, pause request information of the privacy mode for pausing the privacy mode to the server;

transmitting, by the server, the still image associated with the monitoring area to the monitoring center based on the pause request information of the privacy mode;

displaying, by the monitoring center, the still image associated with the monitoring area transmitted from the server; and providing, by the monitoring center, information on emergency occurrence to a pre-registered police station server when it is determined that there is an intruder in the still image associated with the monitoring area.

3. A monitoring system having a personal information protection function, the monitoring system comprising:

a still image acquiring device configured to acquire a still image associated with a monitoring area and transmit the acquired still image;

a server configured to determine, when receiving the still image transmitted from the image acquiring device, whether a privacy mode for the monitoring area is set and transmit, when motion of at least one object is detected in the still image while the privacy mode for the monitoring area is set, only metadata associated with the motion of the at least one object in the still image without sending the still image;

a monitoring center configured to display one or more avatars corresponding to the metadata on a predetermined background color or background image based on the metadata and transmit image reception request information for verifying the still image associated with the monitoring area based on the metadata; and a terminal configured to verify the still image associated with the monitoring area acquired by the still image acquiring device by interlocking with the server based on the image reception request information and transmit pause request information of the privacy mode for pausing the privacy mode to the terminal, wherein the metadata associated with the motion of the at least one object in the still image includes at least one of number of the at least one object in the still image, location information of the at least one object in the still image, a type of the at least one object, a shape of the at least one object, a color of the at least one object, a type or color of an article held by the at least one object, and situation recognition information, the metadata being acquired by analysis of the still image according to deep learning.

4. The monitoring system of claim 3, wherein the server is configured to transmit the still image associated with the monitoring area to the monitoring center based on the pause request information of the privacy mode, and the monitoring center is configured to display the still image associated with the monitoring area transmitted from the server and provide information on emergency occurrence to a pre-registered police station server when it is determined that there is an intruder in the image associated with the monitoring area.

* * * * *